Sept. 15, 1925. 1,553,884
E. TYDEN
DRY PIPE VALVE
Filed March 10, 1922 6 Sheets-Sheet 1
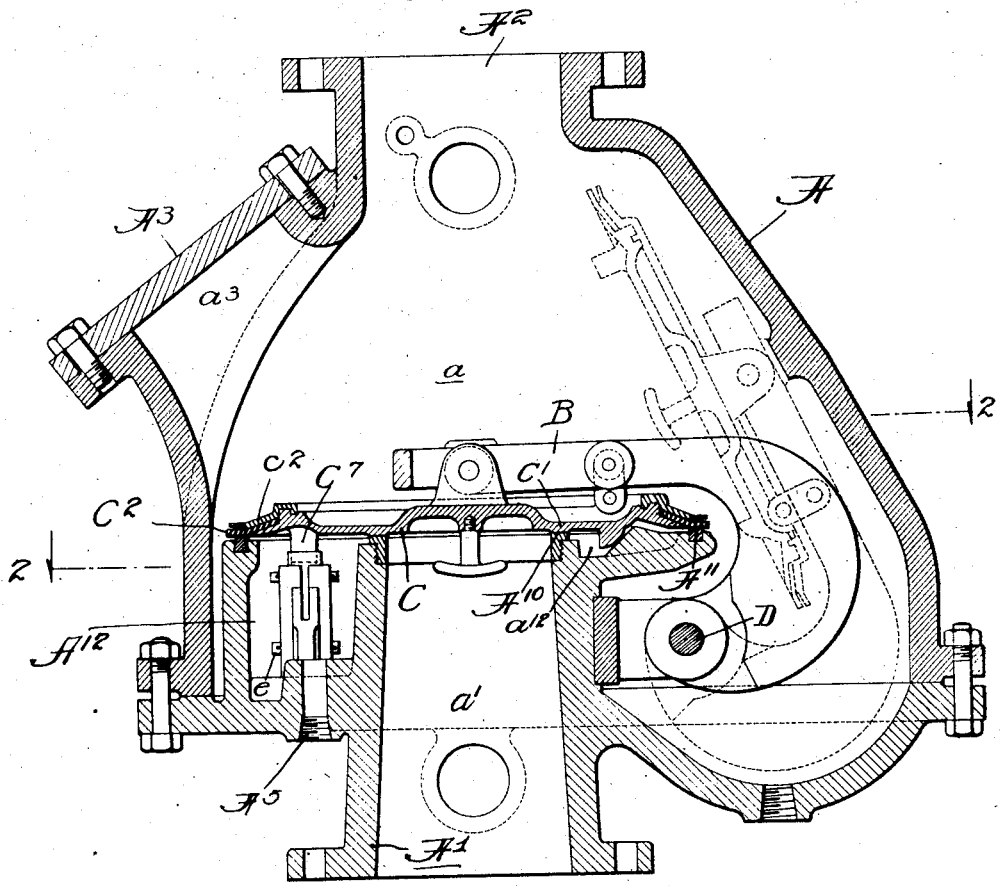

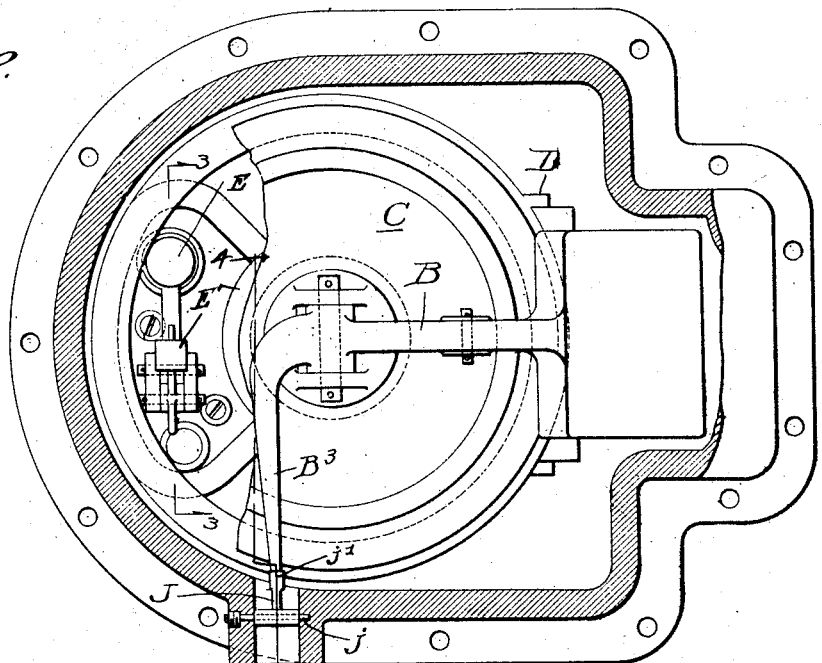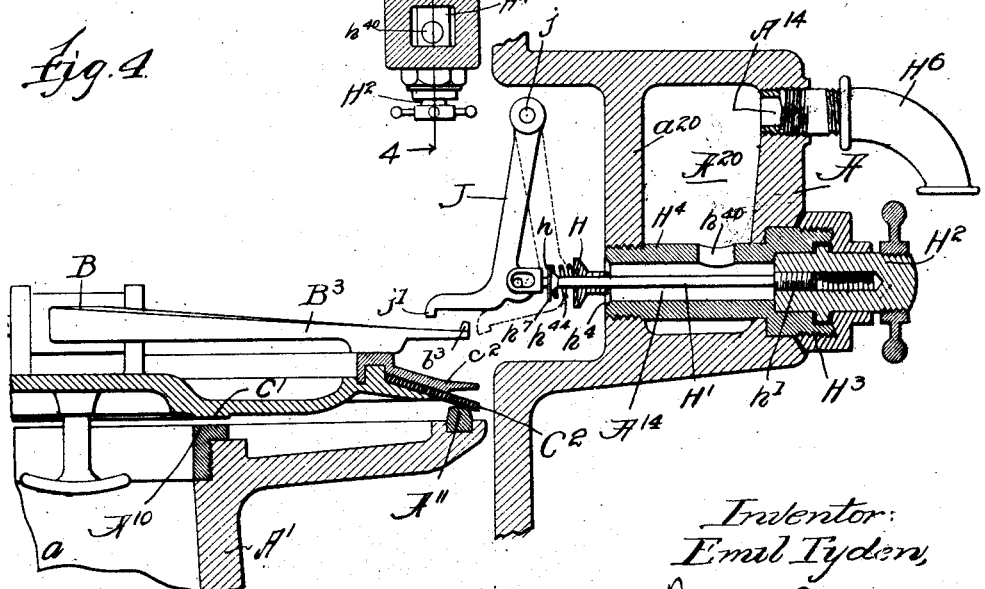

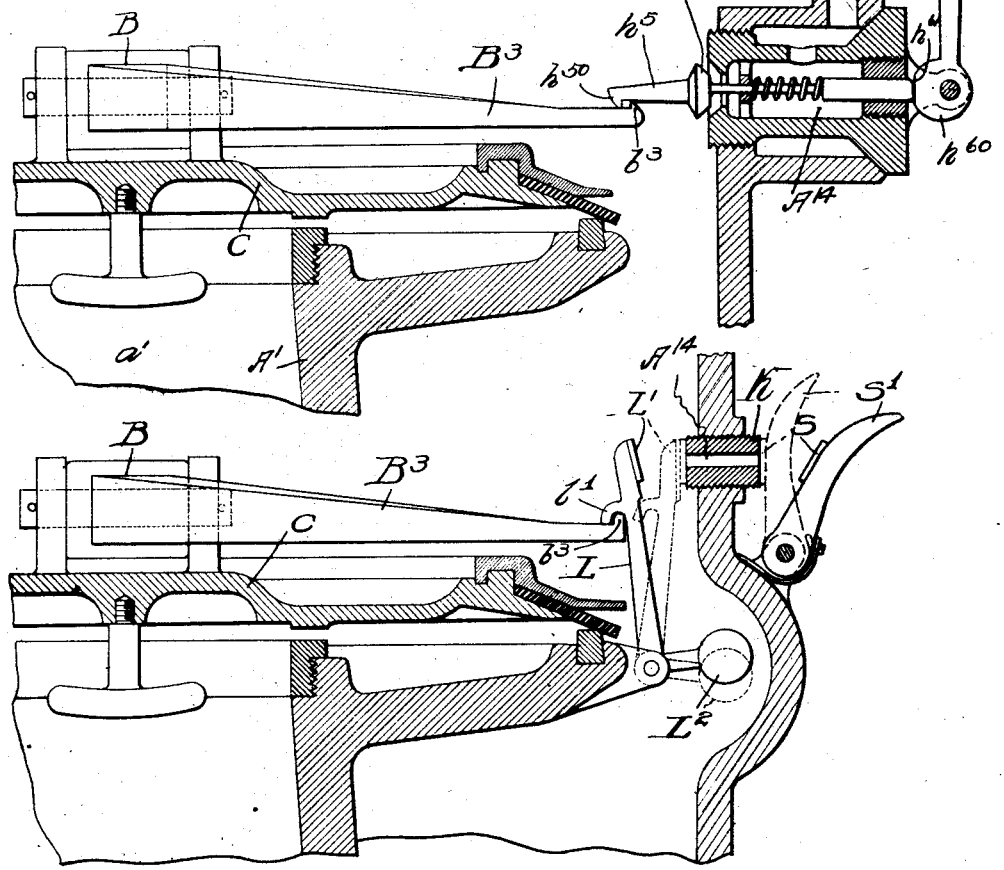

Sept. 15, 1925.  
E. TYDEN  
1,553,884  
DRY PIPE VALVE  
Filed March 10, 1922  6 Sheets-Sheet 4
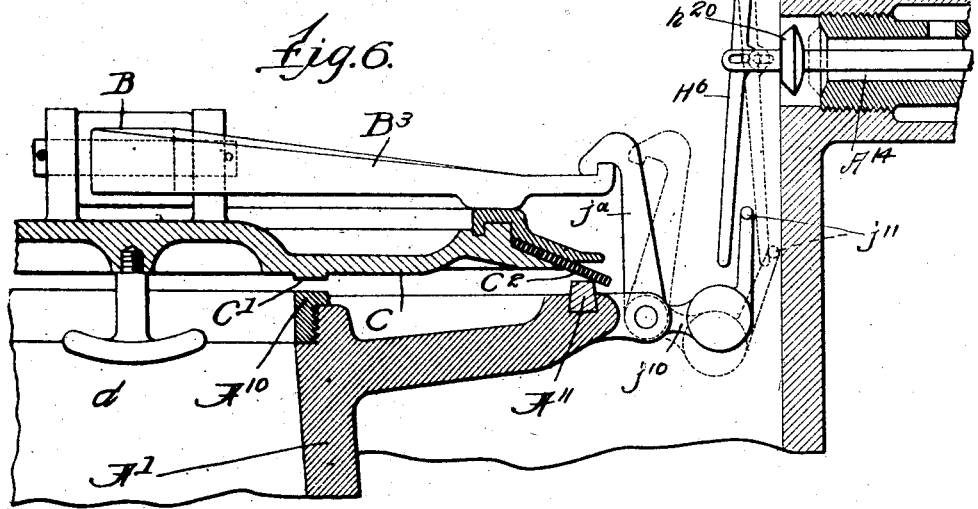
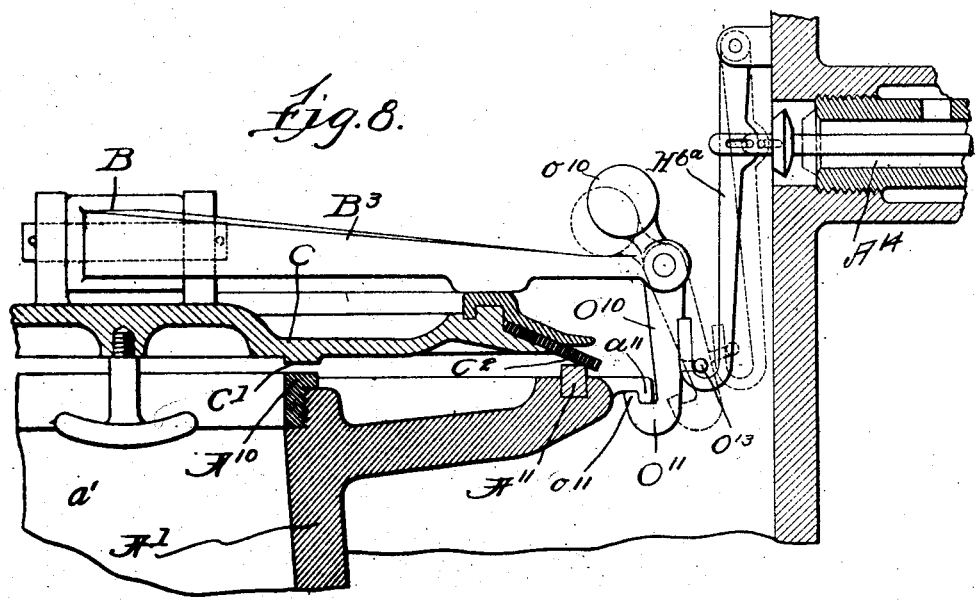

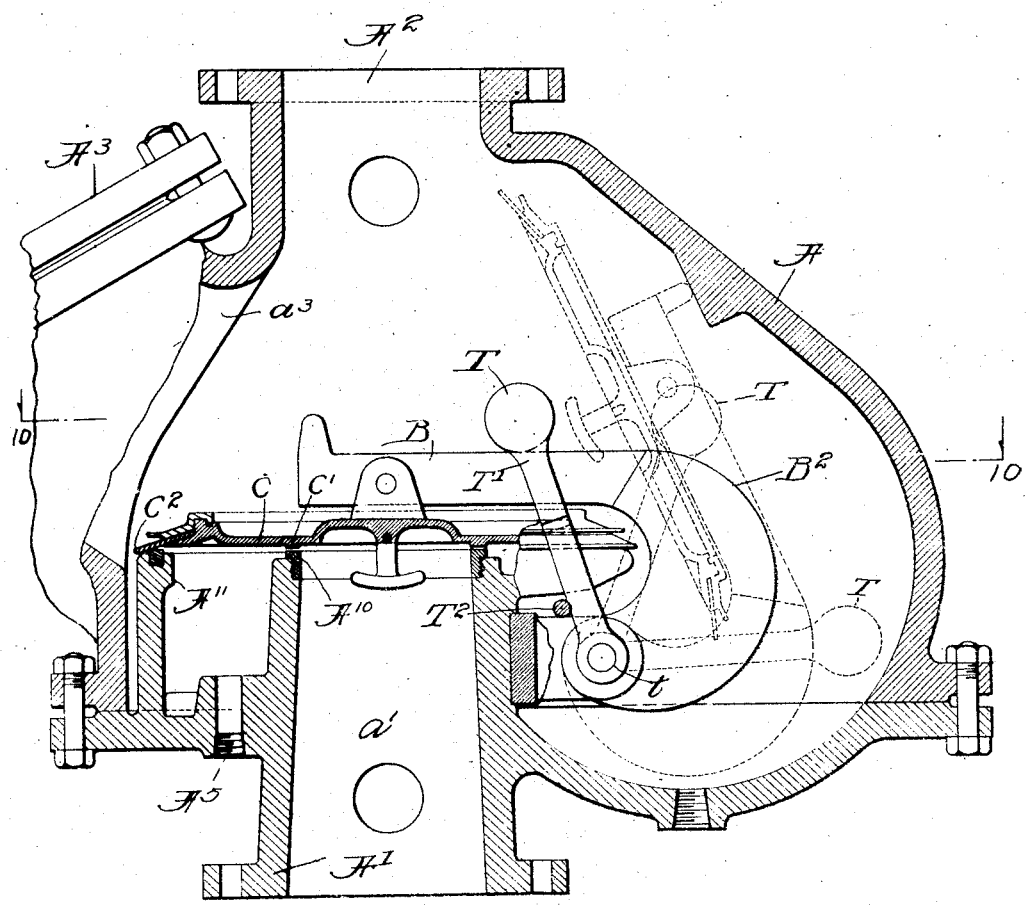

Sept. 15, 1925.

E. TYDEN 1,553,884

DRY PIPE VALVE

Filed March 10, 1922   6 Sheets-Sheet 6

Inventor:
Emil Tyden,
by Burton & Burton
his Attys

Witness

Patented Sept. 15, 1925.

1,553,884

UNITED STATES PATENT OFFICE.

EMIL TYDEN, OF EVANSTON, ILLINOIS.

DRY-PIPE VALVE.

Application filed March 10, 1922. Serial No. 542,567.

*To all whom it may concern:*

Be it known that I, EMIL TYDEN, a citizen of the United States, and resident of Evanston, in the county of Cook and State of Illinois, have invented certain new and useful Improvements in Dry-Pipe Valves, of which the following is a specification, reference being had to the accompanying drawings, forming a part thereof.

The purpose of this invention is to provide an improved construction in a dry pipe valve which shall be different in certain respects and more effective in certain respects than devices of this class now in common use. It consists in the elements and features of construction shown and described as indicated in the claims.

In the drawings:—

Figure 1 is a vertical section of a dry pipe valve embodying this invention, in a plane axial with respect to the in-lead and outflow passages.

Figure 2 is a section at the line, 2—2, on Figure 1, showing in plan view the valve seats and interseat drainage device and connections, the valve being assumed to be at open position.

Figure 3 is a section at the line, 3—3, on Figure 2.

Figure 4 is an enlarged section at the line, 4—4, on Figure 2.

Figure 5 is a similar view showing a modification of the valve locking device.

Figure 6 is a similar view showing a third form of the valve locking and releasing device.

Figure 7 is a similar view showing a fourth form of said devices.

Figure 8 is a similar view showing a fifth form of the same.

Figure 9 is an axial section showing a different construction for over-balancing the inlet valve for seating and also for unseating.

Figure 10:
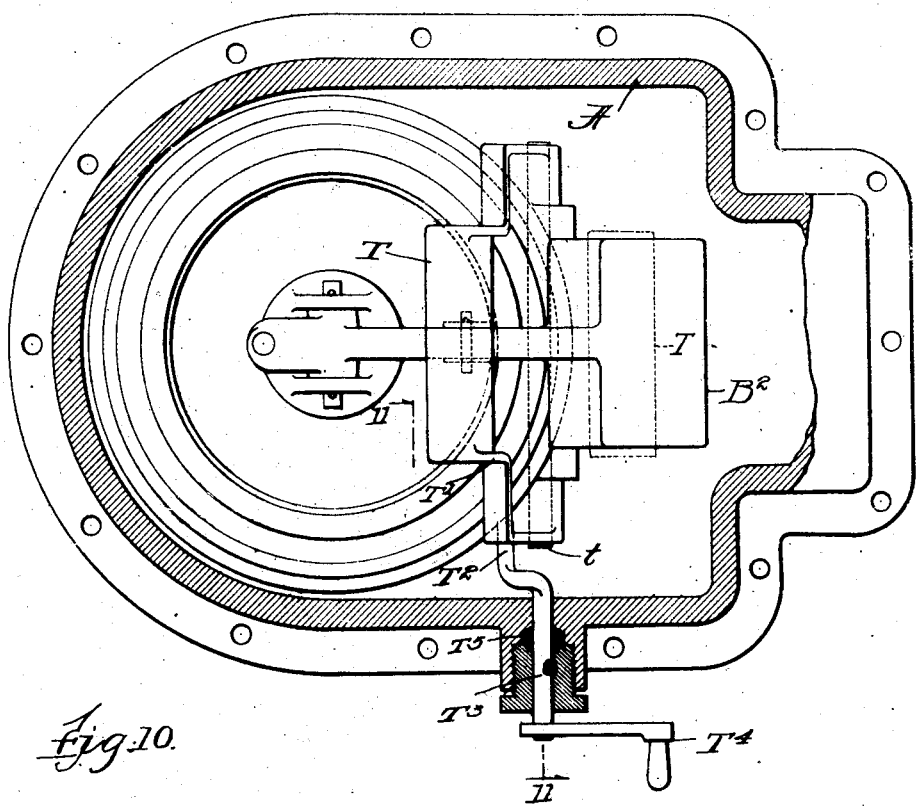
Figure 10 is a section at the line, 10—10, on Fig. 9.
Figure 11:
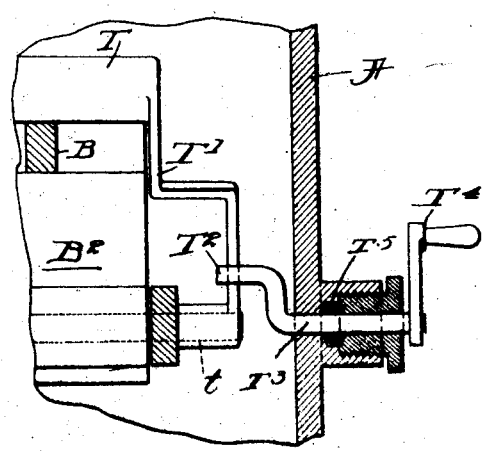
Figure 11 is a detail section at the line, 11—11, on Figure 10.

The structure shown in the drawings comprises the valve casing, A, having water in-lead, $A^1$, and outlet, $A^2$. The inlet passage, $a^1$, is encompassed by two valve seats, $A^{10}$ and $A^{11}$, respectively, between which there is an inter-seat chamber, $a^{12}$, which at one side of the inlead, $A^1$, is deepened into a sump or drainage chamber, $A^{12}$, having discharge through the drainage port, $A^{13}$. The inlet valve, C, is carried pivotally by the valve lever, B, which is fulcrumed at D, at one side of the inlead, $A^1$, below the plane of the valve seat. The valve has two seating areas corresponding to the two valve seats, $A^{10}$ and $A^{11}$. The seating area, $C^1$, which cooperates with the seat, $A^{10}$, is preferably formed directly upon the metal face of the valve; but the seating element or member of the valve for seating upon the outer seat, $A^{11}$, is formed by a flexible annulus, $C^2$, secured by its inner margin to the valve body by a clamping ring, $c^2$, the annular margin of the valve body, C, upon which the flexible annulus, $C^2$, is lodged and clamped by the ring, $c^2$, being preferably sloped at an angle to the plane of the valve seat, so that the free or unclamped outer marginal portion of the annulus, $C^2$, is flexed from its normal, frusto-conical form to the plane of the valve seat in order to seat thereon, as seen in Figure 1. Both by reason of the flexible character of this seating annulus and also by reason of the preferably yielding character of the valve seat, $A^{11}$, which may be a rubber ring let into the metal, or by reason of the yielding character of either one of these co-operating elements, $A^{11}$ and $C^2$, the valve seats at the outer seat, $A^{11}$, before it seats at the inner seat, $A^{10}$, for certain purposes as will more definitely hereinafter appear. The valve and its carrying lever, B, considered as a unit, has the weight distributed so that it is normally over-balanced in the direction for opening, and must be held upon its seat by means provided, as hereinafter described. The valve casing is provided with a hand-hole at $a^3$, for which a closure plate, $A^3$, is provided, said hand-hole being positioned so that the operator may conveniently reach in through it to seat the valve and operate the locking or temporary holding means hereinafter described. The lowest point in the mouth of this hand-hole is at a level far enough above the valve to permit filling the valve chamber, $a$, with water to a depth which will afford a sufficient head or pressure of water upon the valve to hold it seated against the tendency to open by gravity. An overflow and air vent passage from the valve chamber, $a$, is provided at $A^{14}$, which has an overflow passage, determines the height to which the water will be accumulated for head upon the valve. It is only a matter of convenience that this overflow is also the air vent opening. A valve device, H, h, is provided for closing the overflow and vent port, A¹⁴. In the forms shown in Figures 4, 5 and 6, this valve device is arranged to be exteriorly operated both for seating and unseating.

In the form shown in Figure 4 there is provided a latch, J, which is pivoted to the casing at j and depends thence so as to overhang the end of a transversely projecting arm, B³, of the inlet-valve-carrying lever, B, at seated position of the inlet valve, to engage said arm for locking the valve. For such engagement the end of the arm, B³, is provided with an up-turned lip, b³, and the latch has a down-turned hook, j¹, adapted to engage said lip, b³, when the valve is at initially seated or water-sealed position at which it is seen in Figure 4,—that is, before it has been depressed to flex the seating annulus, C², enough to bring the inner seat, C¹, of the valve to the inner seat, A¹⁰, and while the valve is open at its said inner seat and lightly closed for water sealing at its outer seat. The latch, J, is operatively connected with the stem, H¹, of the overflow and vent valve, H, h, for holding said valve open when the latch is at position for engaging the inlet lever arm as described, and so that the complete seating of the vent valve device, H, h, withdraws the latch from that position, thereby leaving the inlet valve free to swing open when relieved of the pressure which holds it seated. The valve device, H, h, is exteriorly operated by any convenient means adapted to the character of the valve, as, for example, the nut, H², screwed onto the threaded end, h¹, of the stem, H¹, and extending out through a stuffing box, H³. In this form the overflow valve seat is formed at h⁴, on the inner end of the sleeve, H⁴, which extends through a pocket, A²⁰, in the casing, A, which is an enlargement of the vent passage, A¹⁴, said sleeve having the stuffing box, H³, at its outer end and having its inner end screwed through the web, a²⁰, of the casing and having intermediately an aperture, h⁴⁰, for escape of water into the pocket, A²⁰, from which at the upper end there is provided an overflow spout, H⁶. In order that this valve device may close a port large enough to be convenient for water overflow and at the same time may be so nearly seated as to permit a very slight air vent while there still remains an easily appreciable range of movement of the valve operating means in order to complete the closing, said valve device comprises the two parts, H and h, as noted, the larger part, H, constituting the main closure for the water overflow port, the smaller element, h, being a minor valve on the stem, H¹, on which the major valve, H, is mounted loosely enough to afford slight air leak around the stem until the minor valve, h, is seated at the inner side of the major valve, H; and a spring, h⁴⁴, is provided reacting between the major valve, H, and a flange, h⁷, on the stem, H¹, inward from the minor valve, h. This spring is stiff enough to serve for seating the major valve, H, upon the retraction of the stem,—the complete seating of said major valve being insured by the water pressure which is to be accumulated behind it,—and the minor valve, h, being seated by the final seating movement of the stem compressing the spring, h⁴⁴, the amount of retraction of the stem for such compression being made as great as desired to insure that the operator may readily know whether or not the entire valve device is tightly seated at the completion of the intended seating operation.

In Figure 5 there is an overflow valve, Hᵃ, which is shown positioned approximately at the level of the inlet valve, the vent passage being extended as a discharge or water delivery passage, A²¹, leading up from the valve body to the desired level for water seal, the valve is spring-seated and adapted to be thrust inward off its seat by the eccentric, h⁶⁰, having a flat face at h⁶¹, for holding the valve at open position. From the inner side of the valve there is extended a hook latch, h⁵, which at open position of the valve, Hᵃ, overhangs the end of the arm, B³, of the inlet valve carrying lever, as seen at h⁵⁰, and operates to hold said inlet valve at lightly seated or water-sealed position, the catch-hook, h⁵⁰, of the latch, h⁵, and the catch lip, b³, of the inlet valve lever arm being positioned and dimensioned to come into engagement for stopping the closing movement of the valve, Hᵃ, before that valve is completely seated, and while there is still a slight air vent crevice past it. In either of these forms,—Figure 4 or Figure 5, the operator having seated and latched the inlet valve by hand and admitted the water to afford means for holding it on its seat, but not fully seated, opens the overflow and vent valve, H or Hᵃ, causing the catch hook, j¹ or h⁵⁰, to pass in over the catch lip, b³, and stand at a little distance inward from the latter. The opening of the valve, H or Hᵃ, permitting some waste and lowering of level of the water which has been admitted, will permit the inlet valve to rise slightly without opening at its outer seat, so that the catch lip, b³, stands in the path of the catch hook, j¹, or h⁵⁰. The operator now releasing the valve, Hᵃ, or screwing back the valve, H, for closing, said valve, Hᵃ or H, will be closed to the extent permitted by the encounter of the catch hook, j¹ or h⁵⁰, with the catch lip, b³, which will occur when the major valve member, H, is completely seated, but, while minor valve member, h is still unseated permitting a slight air leak, but not such as to prevent the accumulation of air pressure sufficient to completely seat the inlet valve; and upon such complete seating the catch lip, $b^3$, is depressed out of engagement with the catch hook, $j^1$ or $h^{50}$. The vent valve will then be completely closed by the operator or by its spring, and the latch, J or $h^5$, is out of the path of the opening movement of the inlet valve, so that the latter is free to open upon release of the air pressure which will occur upon the opening of a sprinkler head.

In Figures 6, 7 and 8, valve locking devices having the catch gravity-operated for release are shown. In Figure 6 the catch $j^a$ is shown pivotally mounted on the casing and having an arm, $j^{10}$, extending off from the pivot which over-balances the catch in direction for inlet-valve-releasing movement; and this arm, $j^{10}$ has a finger, $j^{11}$, which is positioned for engagement by a downwardly-extending end of the lever arm $H^6$, which is connected to the stem of the overflow-and-vent valve device, and which is positioned for encounter of its lower end with said finger, $j^{11}$, in the final seating movement of the overflow and vent valve, $h^{20}$ if the catch, $j^a$, has not been released by gravity. This insures that when the vent valve is closed so as to retain the air pressure on the inelt valve the latter shall be free from any interference by the latch, $j^a$, with the opening movement of the inlet valve which should occur when the air pressure is released.

In the form shown in Figure 7, a vent port and vent valve are provided independently of the overflow port and valve, the vent port being provided in a screwed-in plug, K, having a small aperture, the inner end of the plug constituting the seat for the vent valve, $L^1$, which is carried on the upper end of the latch, L, pivotally mounted on the casing at the side of the inlet valve, C, as in the preceding forms, the latch being provided with a counterweight at $L^2$, operating normally by gravity to swing the latch to disengaged position and the valve, $L^1$, to seated position. In this form the engagement of the catch-nose, $l^1$, of the latch with the catch lip, $b^3$, of the valve-carrying lever which is effected manually by the operator when the inlet valve is at the initially seated or water-sealed position, and not fully seated as it is ultimately seated by the air pressure, is released when the valve is thus ultimately seated; and thereupon the catch is swung by the counter-weight, $L^2$, to seated position of the valve, $L^1$, the catch nose being carried out of the path of the opening movement of the inlet valve.

In Figure 8 the gravity-released latch, $O^{10}$, is pivotally carried by a valve and engages the casing adjacent the valve seat, said latch, $O^{10}$, having a counterweight, $o^{10}$, above the pivot of the latch to the valve, and the catch nose, $O^{11}$, at its lower end provided with an up-turned hook, $o^{11}$ for engaging the downturned catch lip, $a^{11}$, of the valve seat. The catch hook, $o^{11}$, being engaged with the catch lip, $a^{11}$, as indicated, at the initially seated or water-sealed position of the valve, becomes disengaged by the full seating of the valve when the air pressure is admitted, whereupon the latch, $O^{11}$, is tilted by its counterweight over to released position of the catch-nose, and the valve is free to lift from its seat without interference from the catch. In this form the lever, $H^{6a}$, corresponding to $H^6$, of the form shown in Figure 6, extends down past the lower end of the catch nose, $O^{11}$, and is then bent up so as to terminate alongside the catch-nose which has a laterally jutting stud, $O^{13}$, with which the up-turned end of the lever engages in the closing movement of the vent and overflow valve for swinging the latch to disengaged position if it has not been thus operated by gravity, that is, if such operation has been prevented by swinging of the parts under pivots or otherwise.

The sump, $A^{12}$, (see Figs. 1, 2 and 4), of the inter-seat chamber, $a^{12}$, is controlled by a valve, E, (see Fig. 3), which is carried upon a bell crank lever pivoted at $e$, on a bracket, $A^6$, mounted at the bottom of the sump or drainage chamber, $A^{12}$. At the upper end of this bracket, $A^6$, there is pivoted a latch, F, which extends through a vertical slot in the up-standing arm of the bell crank lever, $E^1$, said latch having an up-turned nose, $F^1$, for engagement with said up-standing lever arm, preferably with a slightly beveled overhang as at $f^1$, at the upper end of the slot in which the latch plays, for locking the valve, E, at open position, that is, off its seat, $a^4$. The latch, F, it will be understood, is adapted by gravity to drop out of engagement with the valve lever arm, and when it is lifted into engagement it is held in such engagement by the gravity action of the valve lever, E, holding the up-standing arm pressed against the catch nose, $F^1$, of the latch and holding it frictionally, as well as by the beveled overhang, $f^1$, against its tendency to drop by gravity. It will be understood that the purpose of the drainage provision is to take care of any water which may leak past the inner valve seat, or which may pass it in the occasional pulsations to which a valve of this character is liable by reason of sudden changes in water pressure, so that the water shall not accumulate between the two valve seats and thereby cause the maximum water pressure to become operative over the larger area, and thereby possibly to exceed the air pressure of the sprinkler system at the opposite side of the valve. Upon this consideration, it will be understood that the valve, E, should be open at all times after the device has been set,—that is, after the inlet valve is closed, the air pressure having been admitted beyond the inlet valve and the water pressure has been admitted so as to be operative on the lesser area of that valve; but that upon release of the air pressure by the opening of a sprinkler head which should call the device into service by the opening of the inlet valve, the drainage outlet should be closed, since otherwise there would result a discharge of water under full pressure through the drainage port. It will be understood that the latch, F, is provided for locking the drainage valve open in the preliminary setting of the device before the inlet valve is closed; but it will be evident that the mere opening of the inlet valve will not release this latch, and that therefore other provision must be made to cause the drainage valve to close when the inlet valve is opened. For this purpose there is provided upon the under side of the inlet valve a projection, $C^7$, which in the closing movement of the inlet valve encounters the upper end of the catch nose, $F^1$, and depresses the catch nose of the latch, F, out of engagement with the upstanding arm of the bell crank lever, $E^1$, but in so doing said projection, $C^7$, enters into the position previously occupied by the catch nose, $F^1$, and itself serves to lock the valve lever, $E^1$, for holding the valve, E, at open position; and as thus positioned, said projection, $C^7$, is the only means operating for thus holding the valve, E, open. When, therefore, the inlet valve is opened by the release of the air pressure beyond it, the drainage valve, E, is released and closed by gravity. At $A^5$ there is shown a drainage connection from the sump, $A^{12}$, which leads to the customary alarm device, not shown.

The most important function of the construction and operation of the bell crank lever, $E^1$, weighted by the drainage valve, E, the latch, F, which latches it, and the projection, $C^7$, of the inlet valve which releases the latch, is one which has relation to the liability of the inlet valve to be momentarily opened enough to permit water to pass it, by sudden fluctuation of the water pressure. When for an instant the pressure is interrupted and then instantly restored in full, the inlet valve is opened by the momentum of the water under the suddenly restored pressure. In such event, the inlet valve tends to be immediately restored to seated position by the excess of air pressure in the system over the sustained water pressure at the other side of the valve; but if this should be allowed to happen, the water accumulating above the inlet valve by repeated occurrences of this sort would eventually produce a pressure over the full area of the larger seat of the valve which would hold the valve seated notwithstanding relief of the air pressure resulting from the opening of the sprinkler head; and thus the ultimate function of the entire device and system would be defeated. This result is prevented by the upper end of the weighted lever, $E^1$, when released from the latch, F, and held from swinging only by the projection, $C^7$, being swung over by gravity due to the weighting of the horizontal arm of the lever by the drainage valve (or other weight) so as to stand directly under said projection, $C^7$, when the latter is lifted in the initial partial and momentary opening of the inlet valve, thereby preventing said valve from closing when it has thus been once partially opened. This permits the water to drain out past the inlet valve under the air pressure from the sprinkler system; and the drainage valve, E, being closed, the water passes out through the pipe, $A^5$, and operates the alarm, advising the watchman of the necessity of cutting off the air pressure, shutting off the water and resetting the inlet valve.

It will be observed that in the leading forms,—shown in Figures 4, 5 and 6, the catch device of the inlet-valve-locking latch, at its most inthrust position is adapted to be withdrawn a limited distance before encounter of the co-operating catch hooks of the latch and valve lever; and that in this limited withdrawing movement the major overflow valve, H, is seated while the minor vent valve, h, is still open. This is designed for the purpose of ensuring that the vent port shall not be completely closed unless the inlet valve has been fully and finally seated, and so that in the form shown in Figure 7, in which the vent valve is automatically seated when the catch hooks are disengaged, the vent shall be fully closed whenever the inlet valve is fully and finally seated. When the vent valve is automatically seated, as in the form shown in Figure 7, it is possible and desirable to provide for manually and temporarily closing the vent to obtain full compression, which is done by means of the exterior valve, S, which is spring-opened, and manually operable for closing by the handle, $S^1$.

It will be observed that the various valve latching and releasing expedients shown are designed in view of the inlet valve being normally over-balanced for opening from closed position. In Figure 9 there is shown a modified construction by which this over-balanced condition is produced by the final seating of the inlet valve, and by which the operator may shift the over-balance to cause the valve to be held initially but incompletely seated by gravity. For this purpose there is provided rocking over a shaft, $t$, on the inlet valve carrying lever, B, a weighted yoke, $T^1$, which leans away from the inlet valve when it is rocked over its shaft on the valve lever to one limit, and which at the opposite limit, when the inlet valve is at or near seated position, holds the weight, T, at a position inward from,—that is, toward the inlet valve side of,—the vertical plane of the shaft; so that the weight of the yoke and its weight, T, is shifted from one side to the other of the fulcrum of the inlet-valve-carrying lever by rocking it over its shaft, t, slightly away from one limit toward the other. These limits are fixed by the weight, T, lodging on the counterweight, B², of the lever, B, at both limits of its swing. In the casing wall at one side there is mounted a short shaft, T³, having at its inner end a crank arm and wrist, T², which extends past the yoke arm on the side thereof toward the valve,—and at that position the rocking of the shaft, T³, in one direction causes the crank wrist, T², operating against the yoke arm, T¹, to rock the yoke, t, carrying the weight, T, over the fulcrum, so that it will complete its swing in that direction to the outer limit, and thereby shift the counterbalance to the side for causing the valve to normally open by gravity. This expedient, it will be seen, may be a substitute for the latch devices for holding the inlet valve initially seated in the preliminary adjustment before admitting the water for water seal and the air pressure.

It will be understood that the primary purpose of the construction as comprising the main valve and its carrying arm, B, proportioned so as to be over-balanced for normally opening by gravity is the insurance that such opening will occur and become complete if at any time the valve is for an instant forced from its seat so as to admit the air pressure below it, as is lible to happen upon momentary vibration or throbbing in the water column under the valve,—from causes well understood,—making the water pressure for an instant exceed the air pressure. As is well understood in the case of a dry pipe valve having the main valve normally over-balanced for seating instead of for opening as in the present structure, such momentary opening of the main valve by throbbing of the water column is liable to cause accumulation of water above the valve which ultimately, upon several recurrences of such momentary opening, becomes great enough to hold the valve seated when the air pressure is released by the opening of a sprinkler head, thus defeating the entire purpose of the system. Such mischance is avoided by this invention.

It will be understood that for initially holding the valve seated while accumulating the air pressure, the valve may be submerged in water to the necessary depth, either by first manually seating the valve and then introducing the water above it through a hose or by pouring from buckets through the hand-hole, or, by first allowing the casing, A, to be filled with water to the necessary depth and then manually swinging the valve down through the water to its seat. In employing the latter method, the water may be admitted by opening the valve in the water main upon which the casing, A, is mounted, (said water main valve not being shown but understood as necessarily present), said valve being opened not fully but so as to admit the water faster than it will flow out through the drain port past the open valve, E, thus allowing the casing to fill to the proper depth; then when the dry pipe main valve has been manually seated by being swung down through the water, the valve in the water main will be closed and the drain-cock, (not shown), which is connected at A⁶, is opened allowing the water to recede slightly from under the valve while the inter-seat chamber, A¹², is completely drained through the valve, E, which is held open upon the seating of the main valve as already described.

From the foregoing description of the construction, the operation may be understood to be as follows:

The apparatus is "set up" in the customary manner of such devices. The hand-hole being open and the valve, C, being swung to open position and both water and air pressure being cut off, the operator reaching in through the hand hole, cleans the seating areas of the valve and its seats. Then admitting water by slightly opening the water main valve, or supplying water by hose or otherwise poured in through the hand-hole, the valve casing is filled with water up to the point of overflow through the open hand-hole or so nearly to that depth as may be known to be necessary for providing adequate head of water above the valve to hold it seated, when it is depressed to its seat; and the valve is then swung down through the water to its seat. If the water has been admitted by opening the main valve, this valve would now be closed and the drain cock will be opened, causing a recession of the water from below the valve producing partial vacuum so that the valve will be forced to its seat by atmospheric pressure on the water which is above it and seals it. The hand-hole will now be closed and the air pressure admitted, and when the desired air pressure is accumulated, the water main valve is opened and the apparatus is fully set for its function.

Upon the opening of a sprinkler head causing relief of the air pressure to an extent which eliminates the differential of pressure on the two sides of the main valve, this valve will swing open by virtue of the over-balance in the direction of opening, independently of the water pressure, and will thereby be caused to open promptly. The action of the drainage valve, E, in the set-up and in the operation of the device upon the opening of the sprinkler head, is fully described above.

I claim:

1. In a dry pipe valve structure having the water inlet valve carried pivotally and normally over-balanced for opening upon release of the air pressure, the method of holding said valve preliminarily seated to retain the air while accumulating said air pressure thereon, which consists in provisionally seating the valve under a head of water adequate to hold it seated against the over-balancing counter-weight, and, while it is so held by the water, admitting and accumulating air pressure upon the water.

2. In a dry pipe valve structure having the water inlet valve carried pivotally and normally overbalanced for opening by gravity from closed position upon release of the air pressure thereon, the method of holding said valve preliminarily seated to retain the air while accumulating said air pressure thereon which consists in releasably holding it mechanically and while it is so held introducing a head of water above it adequate to reverse the direction of overbalance.

3. In a dry pipe valve operated in combination with a casing and a main valve controlling flow therethrough the casing having an air outlet which while open prevents accumulating air pressure on the valve, and means for closing said air outlet; means for releasably holding the valve seated while accumulating air pressure, said outlet closing means and said releasable valve holding means being inter-dependent so that the former cannot be operated for closing the air outlet until the valve-holding means is released.

4. In a dry pipe valve for a sprinkler system, in combination with a casing having water inlet and outlet, a valve seat at the inlet, a valve having a lever by which it is carried pivoted in the casing for swinging to carry the valve away from its seat, the valve and its carrying lever being as a unit over-balanced for gravity movement of the valve away from its seat, by a predetermined amount, the casing having the capacity for a head of water above the valve in excess of said predetermined amount and releasable means for holding the valve provisionally seated while accumulating a head of water above it adequate to hold it finally seated, said means being compulsorily released before air pressure on the valve system can be maintained.

5. In a dry pipe valve for a sprinkler system in combination with a casing having water inlet and outlet, a valve seat at the inlet; a valve and a lever arm by which it is carried pivoted in the casing for swinging inwardly with respect to the direction of water flow to carry the valve away from its seat, the valve and its carrying lever being as a unit related to the pivot so that at seated position of the valve said unit is overbalanced in the direction for gravity movement of the valve away from its seat in the absence of air pressure on the valve, and releasable means for holding the valve seated against the tendency to open by gravity while accumulating above said valve a head of water adequate to hold it seated while admitting the air pressure; the casing having an opening preventing retention of air pressure and means for closing said opening inoperable for closing the same while said releasable means is unreleased.

6. In the construction defined in claim 4, foregoing, an overflow from the casing for limiting the depth of water seal and head above the inlet valve; an exteriorly operable valve for closing said overflow duct; an interiorly operable latch device for holding the inlet valve at sealing position, and connections between the overflow valve and said latch for releasing the latch in the closing movement of the last mentioned valve; whereby the inlet valve may be locked at sealing position against its tendency to open by gravity, for accumulating a water seal and head above it and is released simultaneously with the closing of the overflow.

7. In a dry pipe valve, in combination with a casing having a water inlet and outlet, two valve seats and an inter-seat chamber around the inlet; a drainage outlet for the inter-seat chamber; a gravity-seated valve which controls the drainage outlet; a gravity release latch engaging the last mentioned valve for holding the latter open against gravity, said latch being held at valve-engaging position by friction at its engagement with the valve due to the gravity closing tendency of said drainage valve; an inlet valve having two seating areas for seating at the two inlet seats, the outer of said seating areas and the seat therefor being adapted for encounter and yielding of one of them in the further movement of the valve to reach the inner seat, the inlet valve having an abutment which in said yielding movement encounters and displaces the latch from drainage-valve-locking position and itself enters said position.

8. In a dry pipe valve, in combination with a casing having a water inlet and outlet; two valve seats and an inter-seat chamber around the inlet; a drainage outlet for the inter-seat chamber; a gravity-seated valve which controls the drainage outlet; a latch which holds the drainage valve at open position; an inlet valve having two seating areas for seating at the two inlet seats, the outer of said seating areas and the seat therefor being adapted for encounter and yielding of one of them in the further movement of the valve to reach the inner seat;

the inlet valve having an abutment which in said yielding movement encounters and displaces the latch from drainage-valve-locking position and itself locks said drainage valve open.

9. In a dry pipe valve in combination with a casing having a water inlet and outlet; a pivoted inlet valve adapted to normally open by gravity from initially closed or water sealing position, the valve and its seat being relatively yielding for further movement of the valve in seating direction after being initially seated for water seal; means for locking the valve at initially seated or water sealing position adapted to be released when the valve has been further moved in seating direction, the casing having a vent opening on the side of the inlet valve toward the sprinkler system, a valve for controlling the vent and connections from said vent-controlling valve for releasing the inlet-valve-locking means by the final seating movement of the vent controlling valve.

10. In the construction defined in claim 9, foregoing, the valve locking means being normally out of valve-engaging position, the casing having an opening through which the locking means may be manually engaged with the valve when the latter is initially seated, the casing being adapted to contain below said opening a depth of water above the inlet valve adequate to hold said valve initially seated.

11. In the construction defined in claim 9, foregoing, the vent opening being positioned and adapted to serve as an overflow opening to limit and indicate the filling of the casing with water to the depth necessary for holding the inlet valve initially seated at water sealing position.

12. In the construction defined in claim 9, foregoing, the valve locking means being a latch device connecting a part which moves with the valve to a part fixed with respect to the valve seat, said latch being pivoted on one of said parts and having a hook terminal adapted for engagement with the other of said parts, preventing release of the valve at the initially seated or water sealing position thereof, the hook being disengageable upon the further movement of the valve in seating direction, the latch being counterweighted for releasing by gravity whereby it is disengaged upon the admission of air pressure for fully seating the inlet valve, and is thereupon free for movement by gravity from valve locking position.

13. In a dry pipe valve in combination with a casing having water inlet and outlet; a pivoted inlet valve adapted to normally open by gravity from initially closed position, the valve and its seat being relatively yielding for further movement of the valve in seating direction after being initially seated for water sealing; means for locking the valve at said initially seated position adapted to be released when the valve has been further moved in seating direction, the casing having a vent opening beyond the valve toward the sprinkler system; an exteriorly operable valve for controlling said vent and interior connections from said vent-controlling valve for releasing the inlet valve holding means by the final seating movement of the vent-controlling valve.

14. In a dry pipe valve, in combination with a casing having water inlet and outlet, a pivoted inlet valve which is normally overbalanced for opening from seated position; a latch for locking said valve at seated position, the casing having an air vent beyond the inlet valve; a valve for controlling the air vent, and operating connections from the vent valve for releasing the latch by final closing movement of the vent valve.

15. In the construction defined in claim 14, foregoing, the inlet valve requiring and being adapted for further movement in seating direction after initial seating in order to be fully seated, and the locking connection of the vent valve therefor consisting of interlocking projections positioned and dimensioned for engagement throughout the movement of the inlet valve from initially seated to fully seated position and for disengagement at fully seated position.

16. In a dry pipe valve, in combination with a casing having a water inlet, and an inlet valve, and having outlet leading to a discharge system in which air pressure may be maintained for seating the inlet valve against water pressure, the inlet valve being pivoted and normally over-balanced for opening by gravity from closed position, said inlet valve and its seat being one of them, yielding for permitting movement of the valve in seating direction after initial seating; a latch for closing the inlet valve in said initially seated position, comprising a gravity-released catch, and mutual engagements therefor on the catch and the valve, consisting of interlocking projections positioned and dimensioned for engagement throughout the range of said yielding movement of the valve and for disengagement at the limit of said yielding movement.

17. In the construction defined in claim 16, foregoing, the casing having an air vent beyond the inlet valve, a valve controlling the air vent, and operating connections from said vent valve for withdrawing the catch from its interlocking position, independently of the gravity release from said catch, by the final closing movement of the vent valve.

18. In the construction defined in claim 14, foregoing, the casing being adapted for containing below the air vent, water for sealing the inlet valve to a depth affording pressure adequate to overcome said overbalance of the inlet valve, and hold it initially seated.

19. In the construction defined in claim 14, foregoing, the air vent being a combined vent and overflow, and a combined vent and overflow valve for controlling the same, the casing being adapted for containing below said combined vent and overflow water for sealing the inlet valve to a depth affording pressure adequate to overcome said overbalance of the inlet valve and hold it initially seated, the casing having a hand-hole through which the inlet valve may be initially seated manually, and means for latching it in such initially seated position, and connections from the combined overflow and vent valve for releasing said latching means in the final closing movement of said overflow and vent valve.

20. In the construction defined in claim 14, foregoing, the latch being pivoted on the casing and over-balanced for seating the vent valve in the movement for releasing the inlet valve.

21. In combination with the construction defined in claim 14, exteriorly operated means for closing the vent port independently of the latch-connected vent valve.

22. In a dry pipe valve in combination with the casing having water inlet and outlet, and a valve controlling the inlet, a stop device adapted to be positioned by gravity for stopping the inlet valve movement in its seating direction at a partly open position; a latch for holding this stop device out of said inlet-valve-stopping position; the inlet valve having an abutment which in the closing movement of the valve disengages said latch and itself locks the inlet-valve-stopping device out of valve stopping position, which abutment in the movement of the inlet valve away from closed position, releases the stop for its return movement by gravity to position preventing the return of the inlet valve to closed position.

23. In the construction defined in claim 19, foregoing, the latch being adapted to be disengaged from the inlet-valve-stopping device by gravity and held engaged by the gravity action of said valve-stopping device, tending to move into valve stopping position.

24. In the construction defined in claim 19, foregoing, a drainage valve carried by the inlet-valve-stopping device in position to be held open when said valve-stopping device is held out of inlet-valve-stopping position, and be closed by the movement of said valve-stopping device into this valve-stopping position.

25. In a dry pipe valve, in combination with a casing having a water inlet and inlet valve, and having an outlet leading to a discharge system in which air pressure may be maintained for seating the inlet valve against water pressure, the inlet valve being pivoted and normally over-balanced for opening by gravity from closed position, said inlet valve and its seat being, one of them, yielding for permitting movement of the valve in seating direction after initial seating; a latch for holding the inlet valve in said initially seated position, comprising a gravity released catch adapted to engage the valve at initially seated position and to release it upon movement of the valve for fully seating.

26. In a dry pipe valve structure having the water inlet valve carried pivotally and normally overbalanced for opening from closed position upon release of the air pressure, the method of holding said valve preliminarily seated to retain the air while accumulating said air pressure thereon which consists in provisionally seating the valve and holding it seated in a depth of water adequate for substantially sealing it at its seat and while it is so seated admitting and accumulating air pressure above the sealing water.

27. In a dry pipe valve for a sprinkler system in combination with a casing having water inlet and outlet, a valve seat at the inlet, a valve having a lever by which it is carried, pivoted in the casing for swinging to carry the valve away from its seat, the valve and its carrying lever being as a unit overbalanced for gravity movement of the valve away from its seat by a predetermined amount, the casing having capacity for a depth of water above the valve adequate for sealing the valve at its seat; means brought into operation in the provisional seating of the valve for holding the valve to its seat, said means being adapted to be released to release the valve when the air pressure has been accumulated above the sealing water.

28. A dry pipe valve system having the water inlet valve constructed and arranged to be seated with exposure of the greater area to the air pressure of the system for holding it closed and exposing of lesser area to the pressure for opening it, and arranged for being seated before introduction of the air pressure, and to be held seated after introduction of said air pressure solely by the superiority of said air pressure upon the greater area to the water pressure upon the lesser area, said valve being at seated position normally overbalanced for opening by gravity; whereby upon any opening of the valve permitting equalizing of the opening and seating pressures the valve will be fully opened by gravity.

In testimony whereof, I have hereunto set my hand at Chicago, Illinois, this 18th day of February, 1922.

EMIL TYDEN.